April 11, 1967 M. L. BENJAMIN ET AL 3,313,187
BORING BAR INSERT
Filed Feb. 28, 1966 2 Sheets-Sheet 2
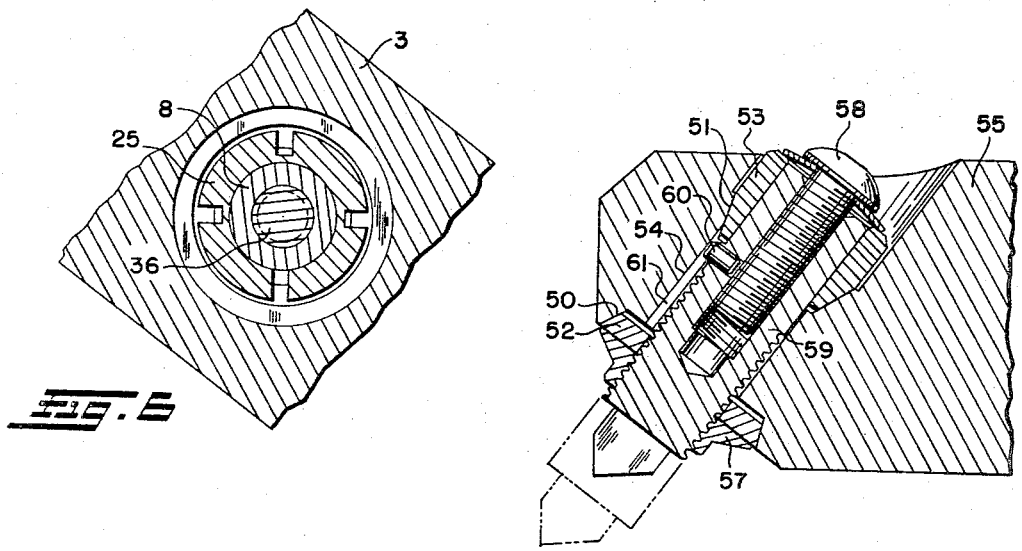
INVENTORS
MILTON L. BENJAMIN
DAVID D. WALKER
BY Oberlin, Maky & Donnelly
ATTORNEYS

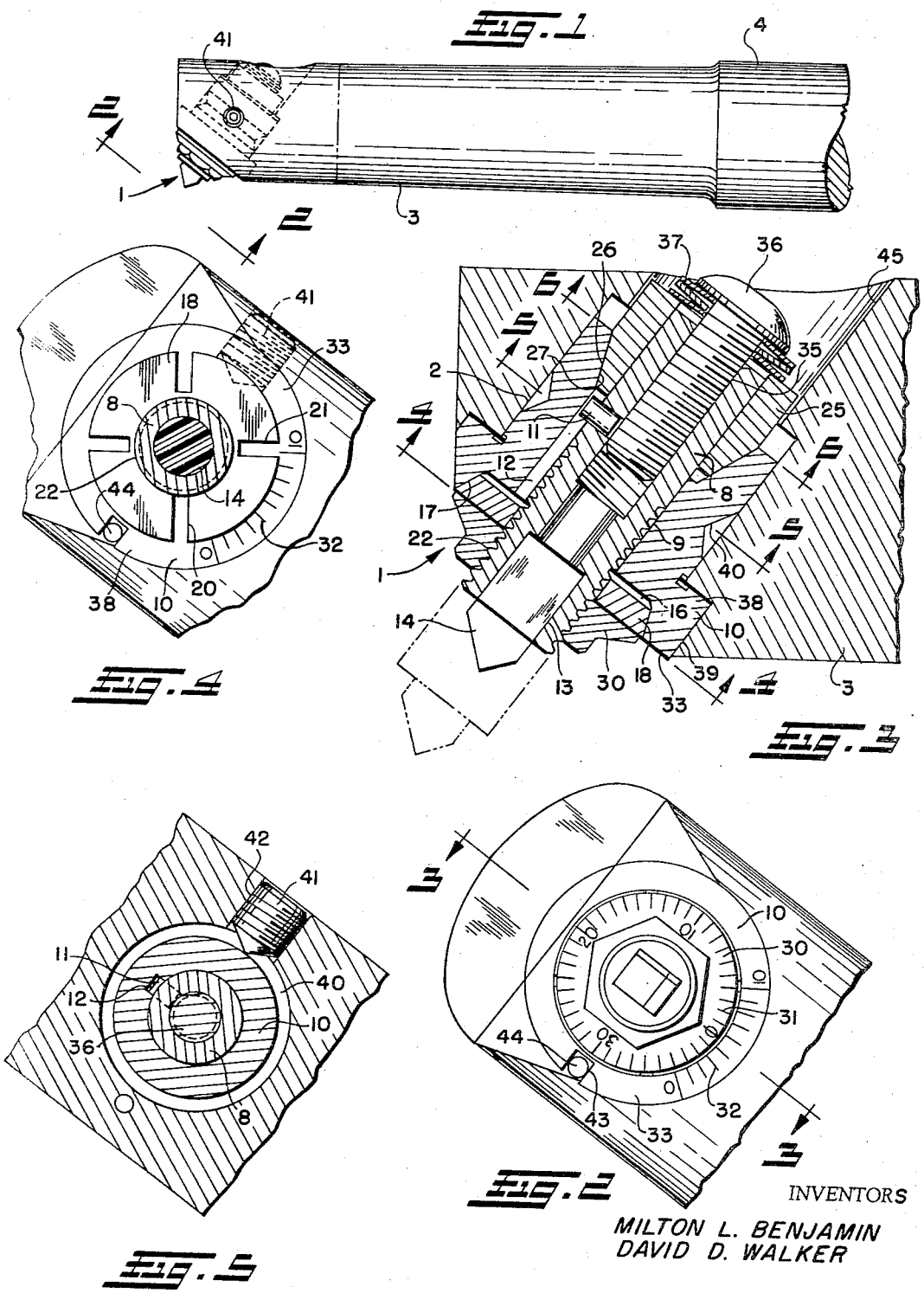

United States Patent Office 3,313,187
Patented Apr. 11, 1967

3,313,187
BORING BAR INSERT
Milton L. Benjamin and David D. Walker, Chagrin Falls, Ohio, assignors to Erickson Tool Company, Solon, Ohio, a corporation of Ohio
Filed Feb. 28, 1966, Ser. No. 530,669
7 Claims. (Cl. 77—58)

The present invention relates generally, as indicated, to a boring bar insert and, more particularly, to a novel boring bar insert of relatively simple and inexpensive construction for accurately locating a tool bit or the like in a wide range of axially adjusted positions within a boring bar.

There are of course many different known types of boring bars, some of which may be very precisely adjusted. However, the more precise boring bars are usually quite expensive and even those are not always as accurate as is sometimes required for precision machining operations primarily due to the radial clearance or play between the threads of cooperating parts which allows undesirable radial or lateral movement of such parts. Moreover, it is usually no simple matter to quickly remove and replace a tool bit when desired, and the mounting hole in the boring bar itself is generally of an irregular configuration which must be formed by special broaching or similar type operations.

It is accordingly a primary object of this invention to provide a novel boring bar insert which is relatively simple and inexpensive to manufacture and yet is capable of extreme fineness of adjustment unaffected by any play between the cooperating threads of various parts thereof.

Another object is to provide such a boring bar insert in which all or substantially all of the parts thereof may be quickly inserted in and removed from the mounting hole of a boring bar as a unit for ready removal and replacement of tool bits.

Still another object is to provide such a boring bar insert in the form of a cartridge for quick insertion and removal from such mounting hole as aforesaid.

A further object is to provide a substantially circular mounting hole in the boring bar itself for receipt of the boring bar insert.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is a top plan view of the end portion of a boring bar with a boring bar insert constructed in accordance with the present invention mounted therein;

FIG. 2 is an enlarged end elevation view of the boring bar and insert as seen from the plane of the line 2—2 of FIG. 1;

FIG. 3 is an enlarged fragmentary longitudinal section taken on the plane of the line 3—3 of FIG. 2;

FIGS. 4–6 are oblique sections taken on the planes of the lines 4—4, 5—5, and 6—6, respectively, of FIG. 3;

FIG. 7 is a fragmentary longitudinal section of another form of boring bar insert in accordance with this invention attached to a boring bar; and FIG. 8 is a fragmentary longitudinal section similar to FIG. 7, but of still another form of boring bar insert in accordance with the present invention.

Turning now to the details of the various forms of boring bar inserts illustrated by way of example in the drawing and first of all to the FIGS. 1–6 form, such boring bar insert is generally indicated by the reference numeral 1, contained within a bore 2 shown extending at an angle through a boring bar 3. The shank 4 of the boring bar 3 may be secured to the spindle or quill of a metal-working machine or the like in conventional manner.

As perhaps best seen in FIG. 3, the boring bar insert 1 is of the cartridge type for insertion into the mounting bore 2 as a unit, comprising an elongated cylindrical member 8 telescoped within the bore 9 of a sleeve bushing 10 and keyed thereto as by means of a pin 11 projecting into a longitudinal slot 12 in the wall of the bore 9 for permitting relative axial movement between such sleeve bushing 10 and cylindrical member 8, but not relative rotational movement. The forward end of the cylindrical member 8 may be provided with a recess 13 for receipt of a carbide or like tool bit 14 therein, preferably brazed in place. So also, the bore 9 has a counterbore 16 at its forward end with the side wall 17 of such counterbore 16 being inwardly tapered to provide a seat for engagement by a correspondingly tapered front collet 18.

As perhaps best seen in FIG. 4, the front collet 18 is axially split at 20 and is additionally provided with a plurality of partial slots 21 to permit easy contraction of such front collet into tight gripping engagement with the thread 22 on the cylindrical member 8 for accurately centering the forward end of such cylindrical member within the sleeve bushing 10 even though there may be a radial clearance therebetween, in a manner which will be fully explained hereafter. Preferably, the threads 22 are acme or truncated threads so as to provide flat crests which will not be damaged even though firmly frictionally gripped by the front collet 18.

The trailing end of the cylindrical member 8 is likewise accurately centered with respect to the sleeve bushing 10 by means of a split rear collet 25 sungly fitted on such trailing end and partially slotted in a manner similar to the front collet 18 for ease of contraction into tight frictional engagement with the cylindrical member 8 when its frusto-conical end surface 26 is forced axially into engagement with a similar frusto-conical seat 27 in the sleeve bushing 10.

Threaded onto the forward end of the cylindrical member 8 is a dial member 30 with graduations 31 on the outer face thereof which are adapted to be aligned with graduations 32 on the outer end face 33 of the sleeve bushing 10 for measuring the amount of axial movement of the cylindrical member 8 for a given amount of rotation of the graduated dial 30. As evident, the number of threads per inch on the cylindrical member 8 and the spacing of the graduations 31 on the dial 30 may be varied to achieve the desired amount of tool bit advance per dial revolution.

The other end of the cylindrical member 8 has a threaded longitudinal opening 35 therein for receipt of a cap screw 36 which when tightened is adapted to apply an axial force against the rear collet 25 through the disc springs 37 urging such rear collet toward its seat 27. At the same time the front collet 18 is drawn into engagement with its seat 17, whereby the desired centering of the cylindrical member 8 within the sleeve bushing 10 is effected as aforesaid. Of course, the more the cap screw 36 is tightened, the tighter the cylindrical member 8 is locked in the desired centered relationship.

For accurately locating the boring bar insert 1 within the bore 2 of the boring bar 3, the sleeve bushing 10 is provided with an annular flange 38 adjacent its forward end which is closely slidably received in a counterbore 39 in the boring bar. In addition, there is provided an annular wedge-shaped groove 40 in the sleeve bushing 10 rearwardly of the flange 38 for engagement by a cone point set screw 41 threadedly received in an opening 42 in the boring bar 3, and a longitudinally extending slot 43 in the flange 38 with a pin 44 projecting from the boring bar into the slot for keying of the sleeve bushing 10 to the boring bar 3 against relative rotational movement.

As is now apparent, the boring bar insert 1 may be very quickly and easily mounted on the boring bar 3, it only being necessary to slide the boring bar insert 1 into the bore 2 until its flange 38 firmly engages the bottom wall of the counterbore 37, after which the set screw 41 is tightened and the dowl pin 44 inserted in place so as to firmly lock the sleeve bushing 10 against both axial and rotational movement within the bore 2. Now the cap screw 36 may be loosened and the graduated dial 30 rotated in the desired direction to effect any required amount of axial adjustment of the tool bit 14 as measured by the graduations 31, 32, after which the cap screw 36 is tightened to cause wedging of the front and rear collets 18 and 25 into firm locking engagement with the cylindrical member 8 and thus accurate centered of the cylindrical member 8 within the sleeve bushing 10 as aforesaid.

Although the bore 2 is shown as having a reduced trailing end 45 of a diameter only slightly larger than the diameter of the rear collet 25, it should be understood that such trailing end could be of the same or larger diameter than the bore 2 at the sleeve bushing 10. Moreover, the sleeve bushing 10 with associated set screw 41 and dowl pin 44 could be eliminated and the tapered seats 50 and 51 for the front and rear collets 52 and 53 provided at opposite ends of the bore 54 in the boring bar 55 as in the FIG. 7 embodiment, but in that case one of the collets 52, 53 and graduated dial 57 or cap screw 58 must be removed before the boring bar insert 56 can be assembled or disassembled. Moreover, the cylindrical member 59 would have to be keyed directly to the boring bar as by means of a pin 60 extending into a longitudinal slot 61 in the wall of such bore.

Another obvious modification shown in the FIG. 8 embodiment is that the rear collet 53' could be tapered throughout its length like the front collet 18 or 52, and a pair of oppositely directed pin 60' extending into similar longitudinal slots 61' in the boring bar could be provided for keying the cylindrical member 59' against relative rotational but not relative axial movement. Otherwise, the structure and operation of the FIGS. 7 and 8 embodiments are substantially identical to that of the FIGS. 1–6 embodiment and, accordingly, no further discussion of the same is thought to be necessary.

From the above, it can now be seen that the various forms of boring bar inserts of the present invention are quite simple in construction and even though close tolerances between the stationary and axially movable parts are not maintained, such inserts are capable of providing very fine adjustment of a cutting tool or the like. Another important feature is the ease with which the various forms of boring bar inserts disclosed herein may be assembled and disassembled from the boring bar for quick replacement or removal of a cutting tool.

Other modes of applying the principles of the invention may be employed, change being made as regards the details described, provided the features stated in any of the following claims or the equivalent of such be employed.

We therefore, particularly point out and distinctly claim as our invention:

1. In combination, a boring bar having a bore therein and a boring bar insert disposed in said bore, said boring bar insert comprising a sleeve bushing, means for releasably locking said sleeve bushing in said bore against both relative rotational and relative axial movement, a cylindrical tool holder telescopingly received in said sleeve bushing and keyed thereto against relative rotational but not relative axial movement, said sleeve bushing having inwardly tapered seats at either end, a split collet disposed around each end of said holder and having tapered outer surfaces corresponding to the taper of the respective seats for engagement therewith, a dial member threadedly engaging said holder with one of said collets located between said dial member and bushing, and means for applying an axial inward force against said other collet to cause wedging of said collets into tight frictional engagement with said holder, thereby accurately centering said holder within said bushing.

2. The combination of claim 1 wherein said sleeve bushing has a flange on one end received in a counter bore in said boring bar for accurately locating said sleeve bushing in said bore, and said means for locking said sleeve bushing in said bore as aforesaid comprises an annular wedge-shaped groove in the outer surface of said sleeve bushing engaged by a cone point set screw extending through said bar for precluding relative axial movement, and a pin projecting from said bar into a longitudinal slot in said bushing flange for precluding relative rotational movement.

3. The combination of claim 1 wherein said means for applying an axial inward force against said other collet comprises a screw threadedly received in an axial bore in said holder, and a disc spring interposed between the head of said screw and said other collet.

4. In combination, a boring bar having a bore therein and a boring bar insert mounted in said bore, said boring bar insert comprising a cylindrical tool holder keyed to said boring bar against relative rotational movement but not relative axial movement, a dial member threaded onto the forward end of said tool holder, a first split collet having a snug fit on said holder interposed between said dial member and boring bar, a second split collet having a snug fit on the rear end of said tool holder, the outer surfaces of said first and second collets being inwardly tapered for engagement with correspondingly tapered seats in said boring bar, and means for applying an axial inward force against said second collet to cause wedging of said first and second collets into tight frictional engagement with the ends of said holder for accurate centering of the same within said bore.

5. The combination of claim 4 wherein said bore is counterbored at either end to provide said tapered seats.

6. The combination of claim 4 wherein said means for applying an axial inward force against said second collet comprises a screw member threadedly received in an axial bore in said tool holder, and a disc spring interposed between the head of said screw and said second collet.

7. The combination of claim 4 wherein said first and second collets have a plurality of longitudinal partial slots formed therein to facilitate wedging of said collets into tight gripping engagement with said holder as aforesaid.

No references cited.

WILLIAM W. DYER, Jr., *Primary Examiner*,

G. A. DOST, *Assistant Examiner*.